US012645911B1

(12) United States Patent
Matveev et al.

(10) Patent No.: US 12,645,911 B1
(45) Date of Patent: Jun. 2, 2026

(54) SYSTEM AND METHOD OF EXECUTING NEURAL NETWORKS USING COMPRESSION AND TENSOR COLUMNS

(71) Applicant: Red Hat, Inc., Raleigh, NC (US)

(72) Inventors: Alexander Matveev, Cambridge, MA (US); Justin Kopinsky, Cambridge, MA (US); Mark Kurtz, Medford, MA (US); Dan Alistarh, Meyrin (CH); Rati Gelashvili, Cambridge, MA (US); Nir Shavit, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1240 days.

(21) Appl. No.: 17/229,308

(22) Filed: Apr. 13, 2021

Related U.S. Application Data

(60) Provisional application No. 63/009,616, filed on Apr. 14, 2020.

(51) Int. Cl.
*G06N 3/04* (2023.01)
*G06F 17/16* (2006.01)
*G06N 3/08* (2023.01)

(52) U.S. Cl.
CPC .............. *G06N 3/04* (2013.01); *G06F 17/16* (2013.01); *G06N 3/08* (2013.01)

(58) Field of Classification Search
CPC ............. G06N 3/04; G06N 3/08; G06F 17/16
See application file for complete search history.

(56) References Cited

U.S. PATENT DOCUMENTS

| | | | |
|---|---|---|---|
| 5,577,166 A | 11/1996 | Mizuno | |
| 9,558,156 B1 | 1/2017 | Bekas et al. | |

| | | | |
|---|---|---|---|
| 9,811,775 B2 | 11/2017 | Krizhevsky et al. | |
| 9,818,059 B1 | 11/2017 | Woo et al. | |
| 10,157,045 B2 | 12/2018 | Venkataramani et al. | |
| 10,223,333 B2 | 3/2019 | Chetlur et al. | |
| 10,572,568 B2 | 2/2020 | Narayanamoorthy et al. | |

(Continued)

FOREIGN PATENT DOCUMENTS

| | | |
|---|---|---|
| CN | 107832839 | 3/2018 |
| EP | 3 037 980 | 6/2016 |

(Continued)

OTHER PUBLICATIONS

Hackel et al., Inference, Learning, and Attention Mechanisms that Exploit and Preserve Sparsity in CNNs, arXiv:1801.10585v3, Mar. 12, 2020, 17 pages (Year: 2020).*

(Continued)

*Primary Examiner* — Markus A. Vasquez

(74) *Attorney, Agent, or Firm* — Kilpatrick Townsend & Stockton LLP

(57) ABSTRACT

A method and system may operate a neural network (NN), e.g. during inference or training, by executing a first tensor column comprising task instruction code representing at least one computation spanning a number of layers of the NN, the execution producing an output, and compressing that output. In order to execute a next tensor column, the output may be uncompressed to produce uncompressed output; and the second tensor column may be executed, the second tensor column including task instruction code representing at least one computation spanning a number of layers of the NN. The second tensor column may take as input the uncompressed output.

23 Claims, 6 Drawing Sheets

(56) References Cited

U.S. PATENT DOCUMENTS

| | | | |
|---|---|---|---|
| 10,685,082 | B2 | 6/2020 | Bekas et al. |
| 10,719,323 | B2 | 7/2020 | Baum et al. |
| 2010/0076915 | A1 | 3/2010 | Xu et al. |
| 2011/0119467 | A1 | 5/2011 | Cadambi et al. |
| 2013/0138589 | A1 | 5/2013 | Yu et al. |
| 2016/0224465 | A1 | 8/2016 | Morad et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0032487 | A1 | 2/2017 | Ashari et al. |
| 2017/0103313 | A1 | 4/2017 | Ross et al. |
| 2017/0103317 | A1 | 4/2017 | Young |
| 2017/0124452 | A1* | 5/2017 | Tucker ................... G06N 3/063 |
| 2017/0132496 | A1 | 5/2017 | Shoaib et al. |
| 2017/0169567 | A1 | 6/2017 | Chefd'Hotel et al. |
| 2017/0193361 | A1 | 7/2017 | Chilimbi et al. |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0372202 | A1 | 12/2017 | Ginsburg et al. |
| 2018/0046900 | A1 | 2/2018 | Dally et al. |
| 2018/0096226 | A1 | 4/2018 | Aliabadi et al. |
| 2018/0173571 | A1 | 6/2018 | Huang et al. |
| 2018/0204117 | A1* | 7/2018 | Brevdo ................... G06N 20/00 |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1 | 11/2018 | Kadav et al. |
| 2018/0357540 | A1* | 12/2018 | Hwang ............ G06V 30/19173 |
| 2019/0042250 | A1 | 2/2019 | Anders et al. |
| 2019/0042542 | A1 | 2/2019 | Narayanamoorthy et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0171935 | A1* | 6/2019 | Agrawal ................... G06N 3/04 |
| 2019/0179818 | A1 | 6/2019 | Lee |
| 2019/0212982 | A1 | 7/2019 | Yoda et al. |
| 2019/0303743 | A1 | 10/2019 | Venkataramani et al. |
| 2019/0354894 | A1 | 11/2019 | Lazovich et al. |
| 2019/0370071 | A1 | 12/2019 | Mateev et al. |
| 2019/0370644 | A1 | 12/2019 | Kenney et al. |
| 2020/0034710 | A1 | 1/2020 | Sidhu et al. |
| 2020/0097826 | A1 | 3/2020 | Du et al. |
| 2020/0104717 | A1 | 4/2020 | Alistarh |
| 2020/0117999 | A1* | 4/2020 | Yoon ................... G06F 12/0811 |
| 2020/0160181 | A1 | 5/2020 | Zlateski et al. |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |
| 2020/0342301 | A1 | 10/2020 | Miao et al. |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Parashar et al., SCNN: An Accelerator for Compressed-sparse Convolutional Neural Networks, ISCA'17, Jun. 24-28, 2017 ACM, 14 pages (Year: 2017).*

Jia, Zhihao, Matei Zaharia, and Alex Aiken. "Beyond data and model parallelism for deep neural networks." Proceedings of Machine Learning and Systems 1 (2019): 1-13. (Year: 2019).*

Deshpande, A beginner's guide to understanding convolutional neural networks, Jul. 20, 2016, 16 pages.

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3, 15 pages.

Gale et al., "The State of Sparsity in Deep Neural Networks", Feb. 25, 2019, arXiv:1902.09574v1, 15 pages.

Han et al., "Learning both Weights and Connections for Efficient Neural Networks", 2015, Advances in Neural Information Processing Systems, vol. 28, 9 pages.

Hinton et al., "Distilling the Knowledge in a Neural Network", arXiv:1503.02531v1, Mar. 9, 2015, 9 pages.

Lavin et al., "Fast Algorithms for Convolutional Neural Networks", arXiv:1509.09308v2, Nov. 10, 2015, 9 pages.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", arXiv:1711. 05852v1, Nov. 15, 2017, 15 pages.

Rusu et al., "Progressive Neural Networks", arXiv:1606.4671v3, Sep. 7, 2016, 14 pages.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document, 9 pages.

Georganas et al., "Anatomy of High-Performance Deep Learning Convolutions on SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document, 12 pages.

Kaya et al., "Scalable sparse tensor decompositions in distributed memory systems", SC'15: Proceedings of the International Conference for High Performance Computing, Networking, Storage and Analysis, IEEE, 2015. (Year: 2015), 11 pages.

Kim et al., "Designing Vector-Friendly Compact BLAS and LAPACK Kernels", SC17, Nov. 12-17, 2017, Denver, CO, USA, 12 pages.

Lascorz et al., "Bit-Tactical: Exploiting Ineffectual Computations in Convolutional Neural Networks: Which, Why, and How", arXiv:1803. 03688v1, Mar. 9, 2018, 14 pages.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020, 9 pages.

Papyan et al., "Convolutional neural networks analyzed via convolutional sparse coding." In: The Journal of Machine Learning Research. Jul. 17, 2017 (Jul. 17, 2017) Retrieved on Feb. 20, 2020, 52 pages.

Scardapane et al. "Group sparse regularization for deep neural networks.", arXiv:1607.00485v1, Jul. 2, 2016, 10 pages.

Smith et al., "SPLATT: Efficient and parallel sparse tensor-matrix multiplication", 2015 IEEE International Parallel and Distributed Processing Symposium, IEEE, 2015, (Year: 2015), 10 pages.

Wozniak et al., "GiMMiK-Generating bespoke matrix multiplication kernels for accelerators: Application to high-order Computational Fluid Dynamics", Computer Physics Communications, vol. 202, 2016, pp. 12-22.

Zhangxiaowen Gong et al. "Sparse Train: Leveraging Dynamic Sparsity in Training DNNs on General-Purpose SIMD Processors"; 2019, arXiv:1911.1075vl, Nov. 22, 2019, 12 pages.

Yu, Dong, Li Deng, and Frank Seide. "The deep tensor neural network with applications to large vocabulary speech recognition". IEEE Transactions on Audio Speech, and Language Processing 21.2 (2012): (Year: 2012), 18 pages.

Kurtz, Mark, et al. "Inducing and Exploiting Activation Sparsity for Fast Neural Network Inference." Proceedings of the International Conference on Machine Learning. 2020, 11 pages.

(56) References Cited

OTHER PUBLICATIONS

Robert Lim; "Methods for Accelerating Machine Learning in High Performance Computing"; University of Oregon—AREA-2019-01, 23 pages.

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Israt Nisa et al.; "Sampled Dense Matrix Multiplication for High-Performance Machine Learning"; 2018 IEEE 25th International Conference on High Performance Computing (Hi PC), 10 pages.

"Deephoyer: Learning sparser neural network with differentiable scale-invariant sparsity measures." Anonymous authors, ICLR 2020, 18 pages.

Yuster, Raphael, and Uri Zwick. "Fast sparse matrix multiplication." ACM Transactions on Algorithms (TALG) 1.1 (2005): 11 pages.

Paixao, Crysttian A., and Flávio Codeço Coelho. Matrix compression methods. No. e1049. PeerJ PrePrints, 2015, 33 pages.

Park, Jongsoo, et al. "Faster cnns with direct sparse convolutions and guided pruning." arXiv:1608.01409v5, Jul. 28, 2017, 12 pages.

https://www.kinematicsoup.com/news/2016/9/6/data-compression-bit-packing-101, published Sep. 6, 2016, 16 pages.

Li et al., A CPU-based Algorithm for Traffic Optimization Based on Sparse Convolutional Neural Networks; 2017 IEEE 30th Canadian Conference on Electrical and Computer Engineering (CCECE).

Howard, Andrew G. et al. "MobileNets: Efficient Convolutional Neural Networks for Mobile Vision Applications." ArXiv abs/1704.04861 (2017).

Krizhevsky., Learning Multiple Layers of Features from Tiny Images, University of Toronto, Apr. 8, 2009.

He, Kaiming et al. "Deep Residual Learning for Image Recognition." 2016 IEEE Conference on Computer Vision and Pattern Recognition (CVPR) (2015).

* cited by examiner

400 — Receive Neural Network and Target Architecture Parameters; Produce Pyramids 410 — Infer Neural Network 420 — Pyramid Accepts Input 430 — Pyramid Executes to Produce Output 440 — Sparsify Output 450 — Compress Output 460 — Write Compressed Ouput 470 — No More Pyramids?

Yes → End

No

480 — Pyramid Accepts Input; Uncompress

SYSTEM AND METHOD OF EXECUTING NEURAL NETWORKS USING COMPRESSION AND TENSOR COLUMNS

RELATED APPLICATION DATA

The present application claims benefit from U.S. Provisional Patent Application No. 63/009,616 filed on Apr. 14, 2020, and entitled "ACTIVATION SPARSE COMPRESSION FOR TENSOR COLUMN COMPUTATION IN NEURAL NETWORKS", incorporated herein by reference in its entirety.

FIELD OF THE INVENTION

The present invention relates generally to the field of neural networks; for example methods for more efficiently processing neural networks by dividing tasks when processing neural networks.

BACKGROUND OF THE INVENTION

Neural networks (NNs), artificial NNs (ANNs) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. The signal at the link between artificial neurons can be for example a real number, and the output of each neuron can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons are divided or arranged into layers, where different layers can perform different kinds of transformations on their inputs and can have different patterns of connections with other layers.

NN systems can learn to perform tasks by considering example input data, generally without being programmed with any task-specific rules, being presented with the correct output for the data, and self-correcting. During learning the NN can execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges. During learning, the NN can be presented with training data. For example, in an image recognition application, a NN can learn to identify images that contain cats by analyzing example images that have been manually labeled as "cat" or "not a cat" and using the results to identify cats in other images.

Various types of NNs exist. For example, a convolutional neural network (CNN) can be a deep, feed-forward network, which includes one or more convolutional layers, fully connected layers, and/or pooling layers. CNNs are particularly useful for visual and/or speech applications. Other NNs can include for example long short-term memory (LSTM) networks.

During inference, the trained NN can recognize or categorize images, perform speech processing, or other tasks.

A NN is typically modelled as an abstract mathematical object, such as a function. A NN can be translated physically to CPU or GPU as for example a sequence of matrix or tensor operations where entries in the matrix represent neurons, edges or links, and kernels and matrix functions represent functions of the NN. (Kernels may be used in CNNs as filters applied repeatedly across an input, one small region at a time.) Thus in practice, NN execution (e.g. the inference or run-time operation) or NN learning is simulated by one or more computing nodes or cores, such as generic central processing units (CPUs, e.g. as embodied in personal computers) or graphics processing units (GPUs such as provided by Nvidia Corporation), which can be connected by a data network. The inferring or executing computation of the network includes a sequence of multiplications of these tensors or matrices.

In a typical NN nodes of one layer depend upon output of a previous layer for input. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of compute power, on the order of 10s or even 100s of Teraflops, or a large set of cores. On modern GPUs this can be done using 4000-5000 cores.

One difficulty with computing each layer at a time can include a requirement that memory size used to store intermediate layer values be driven by a width of the largest layer in the particular NN.

Fast multiplication algorithms are key to the performance of NNs. Properties of NN tensors or matrices can enable faster matrix multiplication algorithms. One such property is sparsity: a matrix is said to be sparse if it contains a lot of entries that are zero (0). While the input matrix of data to be processed at inference or run time (and the sparsity of the input matrix) is, in the prior art, usually out of the network designer's control, the weights or kernels of the NN can be made sparse using for example pruning or sparsification. Among the many parameters in a neural network, a fair fraction are redundant and do not contribute much to the network's output. If the process of pruning is done properly, the resulting sparse network, the one where some of the weights are zero, can actually have the same or improved accuracy relative to the original network. The big benefit however, even when some accuracy is lost, is that the resulting network could be smaller and could have a smaller memory footprint with a proper sparse matrix representation.

SUMMARY OF THE INVENTION

A method and system may operate a neural network (NN), e.g. during inference or training, by executing a first pyramid task or tensor column comprising task instruction code representing at least one computation spanning a number of layers of the NN, the execution producing an output, and compressing that output. In order to execute a next tensor column, the output may be uncompressed to produce uncompressed output; and the second tensor column may be executed, the second tensor column including task instruction code representing at least one computation spanning a number of layers of the NN. The second tensor column may take as input the uncompressed output.

Embodiments of the invention may include a synergy of several interrelated elements, which alone, and more so in combination, may provide improvements over current NNs. Some processes combined may herein be referred to as a) "tensor column processing" or "pyramid processing" where this processing may be sparse or dense; and b) "activation sparsity compression" or "layer input compression".

Embodiments may execute a NN as a collection of tensor column related or pyramid tasks or computations, each executing a subset of the neurons or nodes across several layers, rather than just a subset of the nodes or neurons of a given layer. In some embodiments the subset of network nodes can form an abstract shape of a pyramid or depth wise column. The choice of neurons or nodes executed in each pyramid or tensor-column related task, and in embodiments described herein the use of compression at specific times, can be designed to do one or more of (1) fit the computation of the task, e.g. perfectly, into the cache memory of a computing core executing it, and thus minimize the number of times data must be moved from the cache into and out of an external memory, or from one cache level to another cache level, (2) maximize the utilization of computing cores by load balancing them across the depth of the computation graph rather than across a given layer, and (3) reduce the amount of data that needs to be brought to memory (or from one cache to another cache) at the same time from being proportional to the size of a layer to being proportional to the size of the sum total of the processors' cache sizes. The computation in the pyramid task or tensor column can be dense or sparse, where the sparsity is kernel sparsity, that is, the kernels used in the computation are sparse.

Pyramid or tensor column processing breaks with traditional GPU style executions of such networks, which, apart from fusing the computation of a few types of element-wise layers (such as pooling and Rectified Linear Unit (ReLU)), are typically based on executing the computation layer after layer with multiple cores executing a complete layer in a synchronous or bulk-synchronous fashion. Moreover, unlike prior approaches, in some embodiments of the present invention, each pyramid task can maximize cache buffer reuse and/or reduction of memory bandwidth traffic, which can allow savings in the amount of overall memory that needs to be used at any given point in the computation (e.g. avoiding storing a whole layer's data in memory at the same time).

Embodiments of the present invention may improve NN execution by executing NNs to allow for all of the computing power to be used in each execution cycle. Embodiments may enable a processing unit (e.g., a CPU, a GPU and the like), to execute or infer an NN such that computations from multiple layers are performed in parallel, substantially concurrently (e.g., at the same time).

Embodiments may operate NNs optimally, in relation to specific computing environments or target architectures, e.g. by executing the NN-related computations in a manner that best fits various memory configurations and/or sizes for specific computing environments. Embodiments may improve NN processing by performing computations in each execution cycle (e.g., not having to wait for an outcome of one NN layer in order to perform a computation pertaining to a subsequent layer). Embodiments may improve NN processing by avoiding access (e.g., read access and/or write access) to non-cache memory or memory external to a processor.

Embodiments of the invention may include pyramid or tensor column processing that may execute the layered graphs defining NNs on multicore CPUs that typically have large caches and low memory bandwidth. Pyramid or tensor column embodiments may divide computations (e.g., training of the NN and/or executing or inferring the NN) into tasks in a manner that can be agnostic to the layered structure of the network. The NN may thus be broken down into asynchronously executable "pyramid"-shaped or "tensor column"-related tasks that can cross layer boundaries. One or more (e.g., each) task can be executed by a single compute core, encompassing a part of the computation (e.g., the NN inference) that can optimize the cache and/or compute capabilities of this individual core. One benefit of this approach can be to reduce the amount of data brought to memory at any given time so that it can be proportional to (e.g., fully reside in) the total amount of core cache memory and may be agnostic to a size of any given network layer. Another benefit of this approach can be that it can also turn computations that are memory bound into ones that are compute bound for the most complex convolutional transforms and computations. This can speed up the execution of CNNs on CPUs considerably because, for example, it can allow them to overcome their inherent limited memory bandwidth.

According to some embodiments, in a tensor column or pyramid implementation, a first set of tasks may output to a second set of tasks which may output to a third set of tasks, etc. Embodiments of the present invention may include combining the tensor column or pyramid technique with a process of pruning or sparsification of a) kernel or weight data and/or b) input (e.g. activation data). This combination may allow the memory space required for NN computations pertaining to a task to completely reside within a cache. Thus, the task's computations may be completely executed in the cache as a sub-task of the NN computations. (e.g., inference and/or training).

For example, as known in the art, previously available systems for executing NN-related computations may involve convolutional layers that may include one or more kernels that may in turn include a plurality of weight values. In order to obtain efficient computation, the kernels that contain the weights in the network should fit completely in memory (e.g., a cache memory) during execution (e.g. inference). Moreover, the related output should be computed and should reside in memory before a subsequent layer (e.g., an ReLU layer) is executed. (An activation function layer such as ReLU may be considered a separate layer, or not separate but rather part of a layer.) This requirement may be problematic since the kernels and/or output of intermediary computations of the convolutional layer may be too large to fit into the cache of the multicore core that is executing it. Moreover, in some implementations, the kernels must be brought in completely and reside in memory together before the subsequent (e.g., ReLU) computation is performed. Hence, there may be no obvious way to break computations down into sub-computations (e.g., tasks) as desired in a pyramid or tensor column method, as elaborated herein. This can cause performance deterioration. One technique for overcoming this limitation is to sparsify or prune elements of the network, so as to remove certain entities such as weights or values that may be included in one or more kernels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
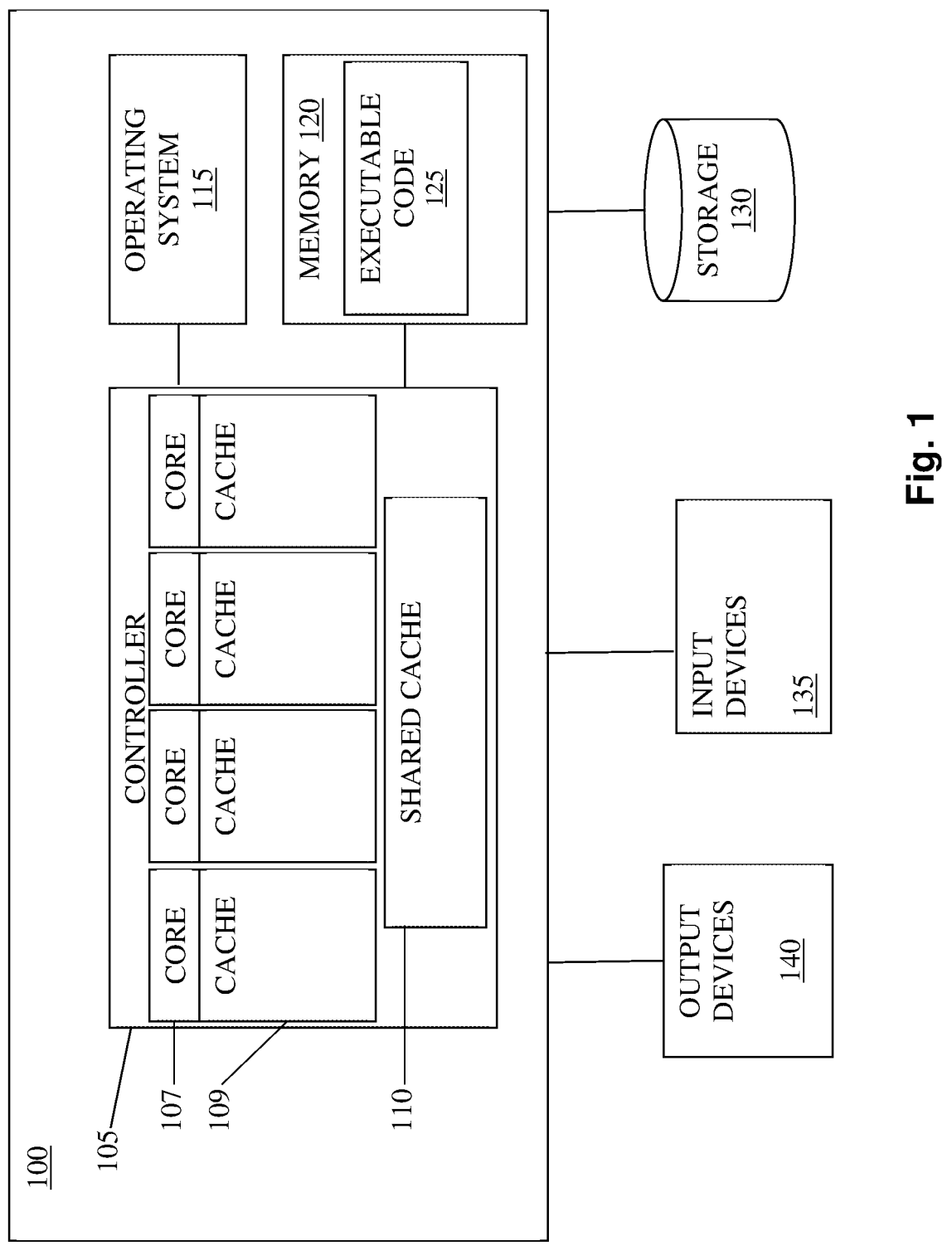
FIG. 1 is a block diagram of a computing device according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. Well-known methods, procedures, and components have not been described in detail so as not to obscure the invention. Features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

When using pyramid or tensor column techniques, due to various data transformations in some layers, it may be impossible to extend a pyramid task through all the layers of a NN. This may be due to cache constraints and/or processing constraints. In such a case a CNN execution would be broken down into several pyramid executions, one following or adjacent to the other. Typically, a pyramid or tensor column would end after a certain number of convolutional layers, that may end with a ReLU layer. The pyramid task may be executed all in cache (e.g. L2 cache), and yet the output of the final layer in the pyramid would be written to L3 cache and/or to memory. It is then again input into the next pyramid or tensor column from L3 cache or memory. There thus may be a sequence of expensive reads and writes to memory between two pyramid executions along the depth of a network. This introduces large delays as a pyramid method may aid in easing the memory-boundedness of a computation, but the inter-pyramid memory traffic slows the computation significantly. This delay is more pronounced when the computation in the pyramids is kernel sparse, that is, uses sparsity in the kernels to reduce the overall compute so that the computation becomes more memory bound.

The term "tensor column" or pyramid calculation may be used herein to indicate a tensor or a set of tensors, and may include computations pertaining to a column (rather than a layer) of neural nodes of the NN, thus allowing improved parallelism in execution of the NN computations. A tensor column or pyramid may operate on only a portion of a layer (and possibly take as input only a portion, e.g. less than the entirety of the output for a layer). Thus for some layers more than one tensor column or pyramid may operate on the layer.

When discussed herein layers that are earlier, previous, before, prior, etc., a certain layer are more towards the input of the NN (e.g. towards input 20 or first (e.g. input) layer 15A of FIG. 2) than that certain layer; and a layer subsequent, after, later than, etc. a certain layer is a layer that is more towards the output of the NN than that certain layer. Such terminology applies within and among pyramid tasks or tensor columns: e.g. the last-executed layer in a pyramid or tensor column is the layer furthest from input and closest to output within the pyramid, and a pyramid closer to input of a NN is earlier in the NN than a pyramid closer to output of the NN. For two adjacent pyramid tasks, an earlier task being closer to NN input may output to a next task closer to NN output, the earlier task being previous to the next task.

Pyramid processing may be used in a NN when the computation is memory bound, either naturally or because of the use of kernel sparsity within the pyramid computation: thus embodiments may use a compression technique that trades additional computing to compress and decompress the outputs and inputs to the pyramidal executions so as to reduce the memory pressure. The cost of this additional computation may be traded for the significant reduction in memory transfers, which are the bottleneck to performance since the computation is memory bound.

Embodiments of the current invention may improve NN processing by reducing the overhead of these inter-pyramid communications with memory by using activation sparsity. Activation may refer to the output of a NN layer. Embodiments may rely on the natural sparsity of activation maps in CNNs. For example, residual models trained on the ImageNet (ILSVRC2012) task (although other architectures, and other datasets for example, CIFAR-10 and 100, may produce similar results)) may have sparsity in activation. Activation sparsity is linked with the structure of the ReLU non-linearity (but also with other functions): if input data to this function were completely random, then we would expect an output activation sparsity concentrated around 50%. However, examining the average activation map sparsity across several batches, one notices that layers which are closer to the input tend to have activation sparsity that is lower than this threshold, whereas later layers tend to have higher activation sparsity. One intuitive (but imprecise) explanation for this phenomenon could be that earlier layers adapt to extract more numerous low-level features, whereas the later layers would extract higher-level features.

Embodiments may use various techniques for compressing sparse data produced as activation or layer output. One embodiment uses the compressed sparse row (CSR) technique which is prevalent in deep learning systems. Using CSR, one can encode a sparse matrix with a reduction proportional to the level of sparsity/1.25; e.g. an 80% reduction in the number of non-zero values end with a 4× reduction in space, and a 90% reduction is an 8× reduction in space.

In some embodiments, a pyramid layer may include a collection of portions of layers of the original NN executed by a collection of depth wise pyramidal tasks or tensor columns. Outputs of pyramids, in particular those whose last convolutional layer is a ReLU layer, may include a large fraction of zero elements in the output matrixes, e.g. have high levels of activation sparsity. This may be true somewhat independently of the level of sparsity that may be introduced by way of the convolutional kernels being sparse via kernel sparsity.

One example series of operations for an inference execution or a forward pass in a training execution according to some embodiments may include:

1) Analyze the NN to determine which layers will be the boundaries between two pyramid or tensor column tasks;

2) Introduce a compression algorithm C on the output matrix of the last-executed (within the pyramid task structure) pyramid layer before it is written from cache (e.g. L2 cache) to external memory or to cache: this may not be on all the pyramid tasks as some of them might not have another pyramid task following them;

3) Introduce a decompression algorithm D on the input matrix of the next pyramid, for example before it is read from memory or cache (where it was stored by the previous pyramid task), or at some point after loading (e.g. during matrix multiplication). The next pyramid may execute using the uncompressed output from the previous pyramid.

In example operation 2, the compressed output is typically written to storage one level below the level in which the layer is executed: e.g. if a layer is executed in an L2 cache its compressed output may be written to an L3 cache; in some implementations the compressed output may be written to memory. Compression algorithm D may decompress data compressed using algorithm C. Partition of the NN to pyramid tasks, or creation of task dimensions, may be automatic, e.g. by a processor such as in FIG. 1. Dimensions of pyramid tasks may include the number of layers and which layers through which the pyramid or tensor column is defined, and the area or width within each layer, or the specific neurons in each layer, the task or tensor column computes on. Tasks, pyramids or tensor columns may be defined by or may include a data structure representing its specific output (from which other data such as input can be inferred), a set of output neurons or pixels of output layers of the task or pyramid, a subset or partition of a NN, for example including one or more nodes or neurons, layers (or portions of layers, the portions defined for example by neurons within the layers), and/or weights and edges of the NN. In this manner the data describing a pyramid, task or tensor column may define the extent, boundaries or edges of the pyramid, task or tensor column.

Boundary layers of pyramid tasks or computations may be for example the first (e.g. input) and/or last (e.g. output) layer of a tensor column. In one embodiment, one or more of the created pyramids or tensor columns may include as a boundary a layer or processing step including an activation function increasing activation sparsity, e.g. increasing the number of zeros produced by the column as output. Thus analysis of the NN for boundaries to create between pyramid tasks may take into account activation function (e.g. ReLU) layers or processing, e.g. creating a boundary or edge after or at a ReLU layer or computation and before the next layer taking input from that layer. Thus a process may create boundaries between adjacent pyramids by creating the boundary to end a pyramid after a ReLU layer, or after a specific type of layer. Often, in NNs, after convolutional layer a ReLU computation takes place. This ReLU computation may boost or increase activation sparsity, such that it may be advantageous to compress the resulting activation data. During operation of the NN, compression may take place at or as part of such a boundary layer of at least one tensor column.

In training, as opposed to inference, the compression may be applied in reverse order, during backpropagation. Compression may be used for example on the outputs (outputting backwards, towards the NN input) of max pooling or similar layers that can generate large numbers of zeros in the backwards path execution during training. A pooling layer may accept a set of inputs from a region or tile (e.g. a square) and perform a function on those inputs to produce one input, for example averaging all elements in a tile, or choosing the one maximum input (e.g. as in a max-pooling layer). Such compression with backpropagation may be used with or without a pyramid or tensor structure. In one embodiment, gradients are compressed and saved before being passed to a previous (e.g. closer to input) layer or tensor column during training. A gradient may be a value passed from a layer backwards to another layer during backpropagation in NN training. For example a gradient may be used to modify weights. In some embodiments, a process for training a NN may include:

1) Analyze the NN to determine which layers will be the boundaries between two pyramid tasks.

2) Train the NN with or without using a kernel sparsification technique (e.g. weight pruning), using for example Forced-Activation-Threshold Rectified Linear Unit (FATReLU) or other techniques to enhance the level of sparsity in the activations only on the last layers of each pyramid or tensor column task that has a pyramidal task immediately following it. This, among other benefits, may enable improved levels of activation sparsity on the ReLUs of the selected layers since most layers that will be inside the pyramid task will not have to be enhanced.

3) Introduce a compression algorithm C on the output matrix of each such selected pyramid task before it is written, e.g. from L2 cache to memory, to another cache, or from and to other storage systems. In backpropagation, the output of a layer or pyramid to a prior (closer to input) layer or pyramid may be the gradient, and thus the gradients may be compressed and saved. However, other values may be compressed and saved to be passed backwards from pyramid to pyramid or layer to layer.

4) Use decompression algorithm D on the input matrix of the next pyramid task before it is read, e.g. from memory or cache (typically where the prior task stored its output).

During backpropagation, a pyramid or tensor column being the last (closest to output) in a series of pyramids or tensor columns may calculate a loss, and use that loss to propagate gradients towards the front of the tensor column. The pyramid or tensor column may compress (as described elsewhere herein with respect to inference) the set of gradients produced by its "first" layer closest to NN input, save the compressed gradients (e.g. to memory or cache as described elsewhere herein), and the next pyramid or tensor column, closer to input, may access (e.g. load from memory or cache) and uncompress the set of gradients to produce uncompressed gradients and apply those gradients to its last (closest to output) layer. This closer pyramid or tensor column may perform backpropagation, using the uncompressed gradients, and the process may repeat if needed with this closer pyramid or tensor column compressing its gradients and providing them to the next closer pyramid or tensor column. An improvement may result from the pyramids allowing the gradients to be saved to cache during backpropagation, combined with compression between pyramids allowing for less memory or cache access when passing data between pyramids (a similar improvement results from compression of data passed forward during inference).

An inference execution may execute in a NN the pyramid tasks of a given pyramidal layer and at the end of the last-executed pyramid tasks the output may be compressed, written, e.g. to memory or to a different cache layer from where the data was processed, and decompressed in the next pyramidal layer. This may not occur with all pyramidal tasks as some of them might not have another pyramidal task following them. Such techniques may save much time executing networks with pyramidal layers as the pyramidal layers are used to reduce memory bound computations. The additional computational cost of compression and decompression may be absorbed by the fact that the computation is memory bound and thus the main source of delays, the traffic to memory, is reduced.

Reference is now made to FIG. 1, which is a block diagram depicting a computing device, which may be included within an embodiment of a system for executing neural networks, according to some embodiments. In some embodiments computing device 100 may execute NN inference, training, or other functions, using e.g. one or more processors such as processor 105, each of which may include multiple cores 107 (e.g. 4, 18, or other numbers), each such core having associated with it a private or local cache 109 (e.g. L1), local to or accessible only by that core, and the multiple cores in a processor sharing a shared cache 110 (e.g. L3), the caches located typically within or as part of the processor on the same chip. Other caches, such as L2 caches, may be included. Caches may store data and/or instructions. Although example embodiments are described in in terms of L1, L2, and L3 cache levels as in Intel architectures, embodiments apply to any other architecture, with or without caches.

Cores 107 may access tasks, code and data via references to external memory 120. The manner and frequency of access of this data, and the size of the sections of data accessed, may cause the data to be kept in caches such as caches 109 and 110. Memory 120 may be external to processor 105 and for example not on the same chip as cores 107 and caches 109 and 110; as opposed to caches 109 and 110, which are typically on the same chip as the processor, local to the processor or internal to the processor, or closer to the processor than memory 120. In some embodiments, some or all of cache storage may be off-chip, not on the same chip as processors or cores, but in general, access to caches 109 and 110 is faster than access to memory 120.

Controller or processor 105 may be or include, for example, one or more central processing unit processor(s) (CPU), one or more Graphics Processing Unit(s) (GPU or GPGPU), a chip or any suitable computing or computational device. Caches may be handled as is known in the art by a cache policy particular to the type or model of processor 105. Processor 105 may be one integrated circuit and cores 107 may be separate processing units each reading and executing program instructions. Thus a single processor 105 can execute different instructions or threads on different cores 107 at the same time, increasing overall speed for programs that support multithreading or other parallel computing techniques.

Computing device 100 may include an operating system 115, a memory 120, a storage 130, input devices 135 and output devices 140. Operating system 115 may be or may include any code segment to coordinate, schedule, arbitrate or control operation of computing device 100, for example, scheduling execution of programs. Memory 120 may be or may include, for example, a Random Access Memory (RAM), a read only memory (ROM), a Dynamic RAM (DRAM), a Flash memory, volatile or non-volatile memory, or other suitable memory or storage. Memory 120 may be or may include a plurality of, possibly different memory units. Memory 120 may store for example, instructions to carry out a method (e.g. code 125), and/or data such as NN data, data describing a NN, NN kernel information, etc.

Executable code 125 may be any executable code, e.g., an application, a program, a process, task or script. Executable code 125 may be executed by controller 105 possibly under control of operating system 115. For example, executable code 125 may when executed cause the NN execution or inference, or matrix multiplication, or the creation of NN or matrix multiply code, according to embodiments of the present invention. For the various modules and functions described herein, one or more computing devices 100 or components of computing device 100 may be used. Devices that include components similar or different to those included in computing device 100 may be used, and may be connected to a network and used as a system. One or more processor(s) 105 including cores in processor(s) 105 may be configured to carry out embodiments of the present invention by for example executing software or code.

Storage 130 may be or may include, for example, a hard disk drive, a floppy disk drive, a Compact Disk (CD) drive, a universal serial bus (USB) device or other suitable removable or fixed storage unit. Data such as instructions, code, NN model data, parameters, etc. may be stored in a storage 130 and may be loaded from storage 130 into a memory 120 where it may be processed by controller 105.

Input devices 135 may be or may include any number of for example a mouse, a keyboard, a touch screen or pad or any suitable input device. Output devices 140 may include any number of displays, speakers and/or any other suitable output devices. Input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause or configure the processor to carry out methods disclosed herein.

In prior art systems for executing NNs, during execution (e.g., inference on incoming data), a first layer executes and the result or output of computation for the layer is written to external memory. After all of the outputs for a layer are written (e.g. by threads), the outputs of the layer may be read from e.g. external memory, as input to the subsequent layer. Previously available systems and methods of executing NNs may require all threads and/or computing devices to complete one layer before moving on to compute or execute the next layer.

In some embodiments of the present invention, a set of tasks may execute, each across multiple layers, each compressing its output. Pyramid or tensor column tasks may execute completely in an L2 cache (e.g. the data does not leave L2 cache until written to memory at a later time) and, thus compression may occur at the end of the task before outputs are written to an L3 cache and external memory; of course other specific cache write configurations may be used. Each pyramidal task in a pyramidal layer may compress its output matrix and the pyramidal layer following it in execution or time may decompresses the matrix as it inputs to it. Embodiments may not require compressing of the outputs of the internal layers of a pyramidal task, though this is of course not precluded. This compression between pyramids may in the specific example given reduce L3 cache to L2 cache traffic by a large factor if there is sufficient sparsity in the intra-pyramidal output layers and the compression algorithm makes good use of them.

Embodiments may use for compression a CSR implementation or a variant of CSR, such as a compressed sparse column (CSC) representation, indexing or compressing columns instead of rows but otherwise similar to CSR. A CSR or CSC representation, or Yale format, of data may be a compression of that data that represents a matrix by several, e.g. three or four, one-dimensional arrays, that respectively contain nonzero values, the extents of rows, and column indices. An example CSR representation may represent the uncompressed data, when compressed, as separate tables or arrays, e.g. four component arrays: (a) a value array which may include all of the non-zero input elements in contiguous memory; (b) an index array which may include the indices of the elements in the input matrix data element I, within their respective row; (c) a row length array, which may include the number of non-zero elements of each row; and (d) a row offset array, which may include the offset denoting the first element of value array element and an index array element corresponding to a given row.

For example, if the source uncompressed input matrix I is:

0 2 3
1 −1 0
0 0 4

The corresponding compressed CSR arrays may include the following example arrays:

Value array=2 3 1 −1 4
Index array=1 2 0 1 2
Row length array=2 2 1
Row offset array=0 2 4

A compression technique may index columns, using CSC, where values are read first by column, a row index is stored for each value, and column pointers are stored. CSC or CSR may be uncompressed by having its elements extracted from the compressed CSC or CSR version, using known methods. While certain compression algorithms are described herein, other compression algorithms may be used. For example, the ZIP compression and decompression method may be used.

Some embodiments may use only the "natural" sparsity produced by activation layers such as ReLU, and some embodiments may enhance the sparsity in the activations using techniques such as where the ReLU functions in a neural network are changed to FATReLU. Many NN architectures can adapt to significantly sparser activation maps without any significant accuracy loss. Embodiments may train a NN that has both sparse kernels and sparse activations; thus outputs of a ReLU layer at the end of a pyramid task may be highly sparse.

A FATReLU activation function may increase the activation sparsity level of a layer (and thus input to matrix multiplication required for another layer) by increasing the value of the threshold T below which all values are mapped to 0, from 0 (as is the case for ReLU) to a dynamically adaptive threshold value T>0, where T may be any positive value. The resulting activation function is described mathematically in example Equation 1 below, for a fixed value of an activation threshold T (e.g., T=1).

$$FATReLU_T(x) = \begin{cases} x, & \text{when } x \geq T; \\ 0, & \text{otherwhise.} \end{cases} \qquad \text{Equation 1}$$

where x is an independent variable, and T is the activation threshold value.

Activation functions other than ReLU or FATReLU may be used.

Figure 2:
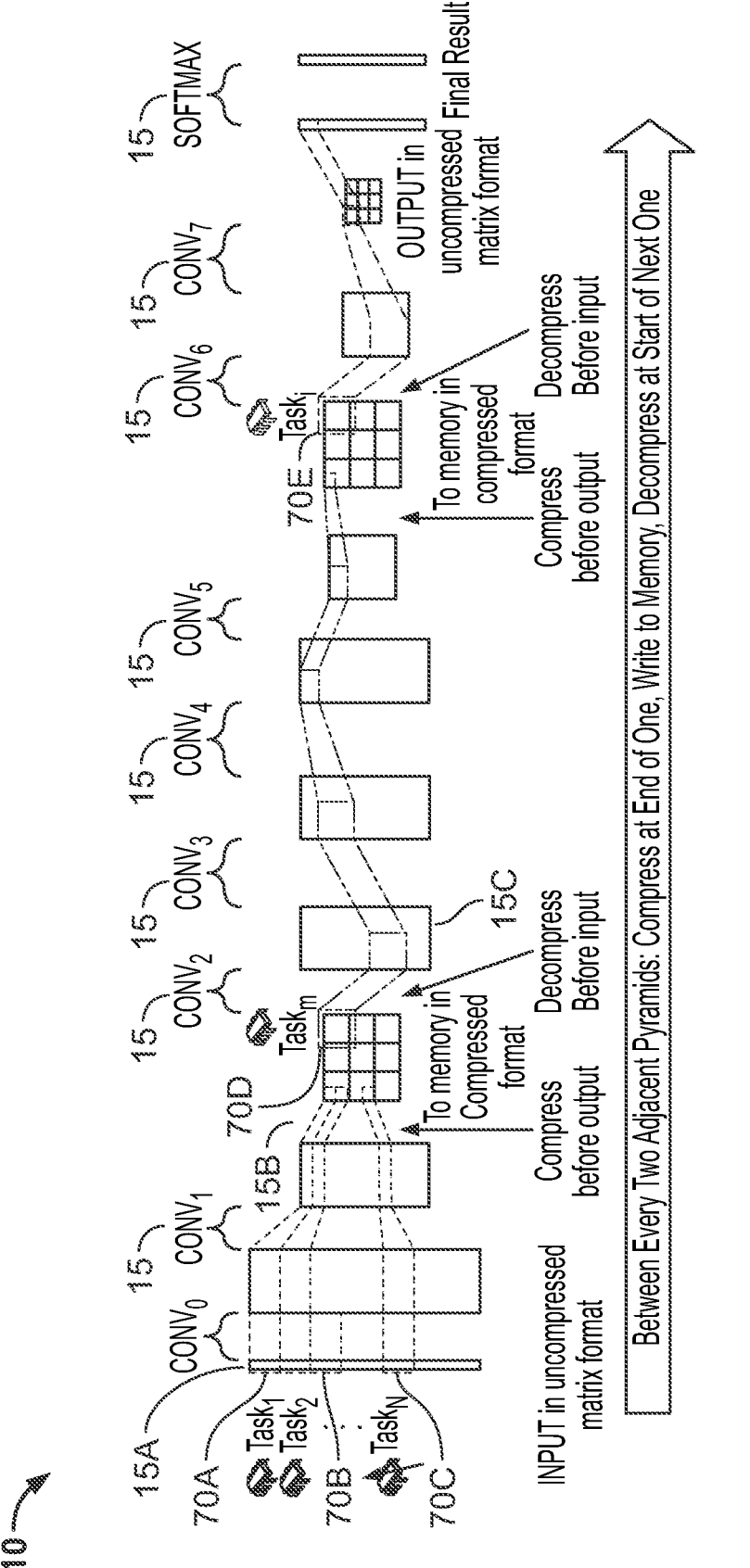
FIG. 2 is a schematic diagram of an example multiple layer NN according to some embodiments of the present invention.

Reference is now made to FIG. 2, a schematic example of a multiple layer NN 10 according to embodiments of the invention. NN 10 (e.g., a convolutional neural network) may include layers 15 (including first layer 15A), such as convolutional layers. Layers 15 may include or use one or more kernels. Input to the NN 10 may input to the first layer 15A. Executing or performing computation of each layer may include applying kernels to incoming data of the convolutional layers. NN 10 may include additional layers and/or logic modules, such as pooling layers, fully-connected layers, ReLU or other activation layers, softmax layers, and the like. Each layer 15 may use memory or cache to store results and/or intermediate computation results or accept input. Sub-computations (e.g., tasks, tensors or pyramids) may span or exist across more than one layer of NN 10. FIG. 2 depicts an embodiment in the example context of a pyramid execution of a CNN with three pyramidal layers (with some pyramid layers including more than one pyramid task) that span several layers of convolutions followed by ReLU with max-pooling layers interleaved. Other specific configurations may be used.

Embodiments of the invention may partition NN 10 to produce separate tasks such computations or tasks 70A, 70B, 70C, 70D and 70E. Sub-computations or tasks 70 may be pyramids, computations or tensor columns and each may span or execute across multiple layers 15. Tasks 70 may be executed in parallel, e.g., concurrently or asynchronously, or at different times. In this manner, execution of NN 10 layer by layer can be avoided, and parts of a layer 15 receiving input from an earlier layer 15 be executed before all of the earlier layer 15 is executed. Computation of first task 70A may require input that may be different and/or independent from the input of second task 70B. Any one of pyramids or tasks 70 (e.g. tensor columns) may not span all the layers of NN 10, and thus a task 70 may have an output layer, the last layer of the task, producing an output, and an input layer, taking input from a previous task or pyramid (or the input 20 to the NN as the case may be). For example, output layer 15B of task 70A outputs to input layer 15C of task 70D. (Layers 15A, 15B and 15C when discussed herein may refer to the entirety of such a layer or the portion of that layer relevant to a specific task.) Pyramids or tasks 70 may be arranged such as a subsequent task takes input from a previous task: e.g. task 70E is subsequent to task 70D, which is previous to task 70E. Tasks 70D and 70E may be adjacent or immediately adjacent to each other. Other input and output layers are not shown for clarity.

Embodiments of the invention may, during execution, perform computation of some tasks (e.g. tasks 70A and 70C) in parallel, and in an asynchronous manner, e.g., on separate threads and/or by separate processing cores. In some embodiments, an OS or processor may assign one pyramid or tensor column to one core, based on OS or processor policies. Embodiments may partition NN to form some tasks 70 that are dependent, and may execute a first task as soon as output of a second, preceding task is ready. For example, as shown in FIG. 2, task 70E may be executed as soon as the output of task 70D is ready, such that task 70E is dependent on task 70D.

The plurality of sub-computations or tasks 70 can be determined prior to execution, possibly automatically by a processor such as shown in FIG. 1. Sub-computations can be determined recursively, moving back from a portion of an output layer of NN 10 and aggregating the sub-computations that are required to produce that portion of output.

Embodiments may partition the NN to tasks 70 so that each task may fit a memory space (e.g., a cache memory) that may pertain or be associated with (e.g. private to) to a processing unit or processing core that executes the respective task. In other words, tasks or tensor columns 70 (or at least one tensor column, e.g. an initial tensor column) may be configured or adapted to fit within a cache memory, or calculated such that the content needed for expected incoming input (e.g., kernels pertaining to the computation and the size of the output of computation) may not exceed a predefined memory threshold. Such size calculations may take into account compression. A predefined threshold may be optimally set or selected based on specific embodiments or configurations of the system. For example, a large cache memory may enable setting a high value to the predefined cache memory threshold. In another example, a high work-load (e.g., a plurality of computing processes or threads) may dictate setting a low value to the predefined cache memory threshold. The calculations may be based on dimensions of a target architecture (the type of processor intended to execute the tasks). Thus, computation (e.g. data and/or instructions) of each task may completely reside within a cache memory of a processing core, facilitating efficient computation of the task. Embodiments may include pruning or sparsification of one or more kernels, to ensure that computation of tasks 70 indeed resides within the designated cache memory space. The extent of computations of each task 70 (e.g., tracing from a subset of output used as incoming input, through a kernel, through another kernel of another layer to a subset of another output) may be calculated so as to keep the required memory space equal to, or lower than the predefined cache memory threshold.

The total amount of memory required to hold output of sub computations along the trace of a task may be smaller than the sum of output spaces along that trace. In some tasks 70, the memory space (e.g., in a cache) required for output of computations pertaining to a first layer may be reused for a computations pertaining to a subsequent layer along the trace of the task 70. Such consideration may take into account compression taking place at the end of a first task and decompression taking place at the start of a second task. In other words, embodiments of the invention may calculate the memory space required for a task based on the reallocation or reuse of memory space for consecutive computations in or along the tasks (e.g., along at least one task).

When creating or defining tasks, all of the outputs and computations needed to create the inputs for each task (e.g., task 70E, which requires the outputs of 70D) may be considered. Each of the preceding tasks (e.g., 70A and 70B) may be traversed back, to aggregate all outputs and/or computations from previous tasks and/or from input layer 20. The extent of each task may be calculated so as to keep the required memory space equal to, or lower than respective predefined cache memory thresholds.

Figure 3:
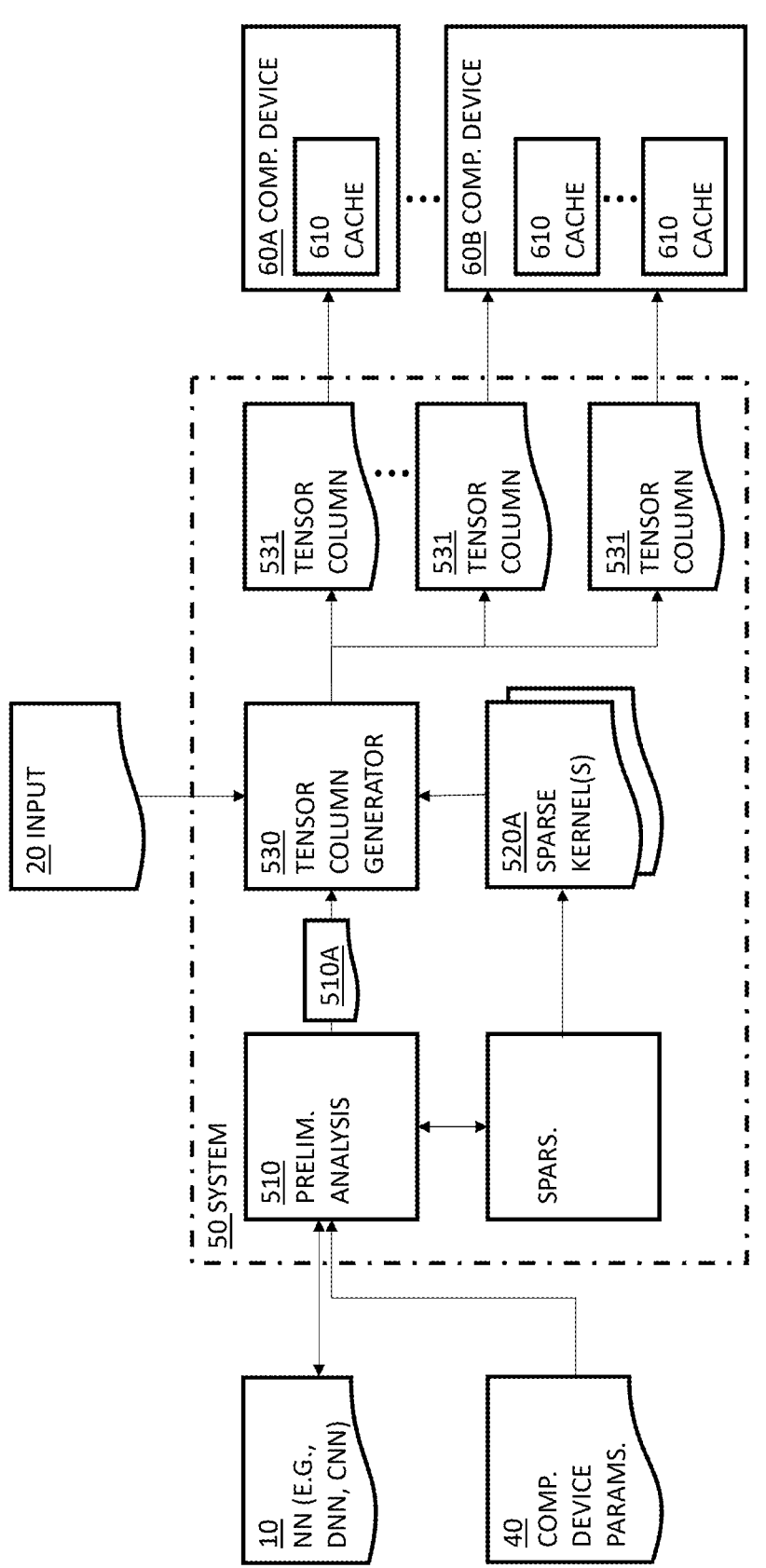
FIG. 3 is a block diagram of an example of a system for inferring or executing a NN according to some embodiments.

Reference is now made to FIG. 3, which is a block diagram, depicting an example of a system 50 for inferring or executing a NN 10 (e.g., on incoming data or input 20), using one or more target computing devices 60 (e.g., 60A, 60B), according to some embodiments. System 50 may be implemented as one or more software processes and/or software threads, and may be executed by one or more processors, controllers or processing cores of a computing device as in FIG. 1.

Alternatively, system 50 may be used for training NN 10 in a back-propagation process. In such configurations, input data 20 may be or may include, for example, feedback data (e.g., supervisory data) and/or cost function values, and the NN may be trained according to the feedback data and/or cost function values, as known in the art.

NN 10 may include a plurality of layers (e.g., layers 15 of FIG. 2) and at least one layer 15 may include or be defined in part by one or more kernels. System 50 may receive a data structure that may represent or define NN 10. For example, the data structure may be or may include tensors, a table, a graph, a linked list and the like, that may include a representation of elements pertaining to NN 10, including for example edges, weights, kernels, and layers that may be included in NN 10. NN 10 may be used to also refer to the data structure and to elements of NN 10 that may be represented by the data structure.

System 50 may receive one or more computing device parameter values 40 pertaining to target computing devices 60 (e.g., 60A, 60B, such as element 1 of (FIG. 1). The term 'target' may refer herein to one or more computing devices or architectures which may be targeted or designated for training and/or executing (e.g., inferring) NN 10. The target computing devices 60 may be or may include the same computing device as the one implementing system 50. Additionally, or alternatively, the target computing devices 60 may include at least one computing device other than the computing device implementing system 50.

Computing device parameter values 40 may include parameter values describing cache memory of the one or more target computing devices 60, for example: data pertaining to a cache memory of (e.g. private to, or associated with) a single processing core (e.g., an L2 cache, as known in the art) and/or data pertaining to a cache memory of (e.g. accessible by) a plurality of processing cores (e.g., an L3 cache, as known in the art). Computing device data may pertain to, for example: a size of a data cache memory, a size of an instruction cache memory, a memory bandwidth of the cache memory (e.g., a rate at which the memory may be accessed), a utilization percentage and/or an available space of the cache memory, and the like. Parameters 40 may include data describing a workload of a computing device, a structure (e.g., a number of processing cores) of a target device, or processing throughput or speed of each processing core.

System 50 may analyze the data structure of NN 10 and may produce one or more tasks (e.g., tasks 70 of FIG. 2). As shown in FIG. 2, the produced tasks 70 may be or may include partitions of NN 10 and may include at least one computation that pertains to a kernel of NN 10.

Figure 5:
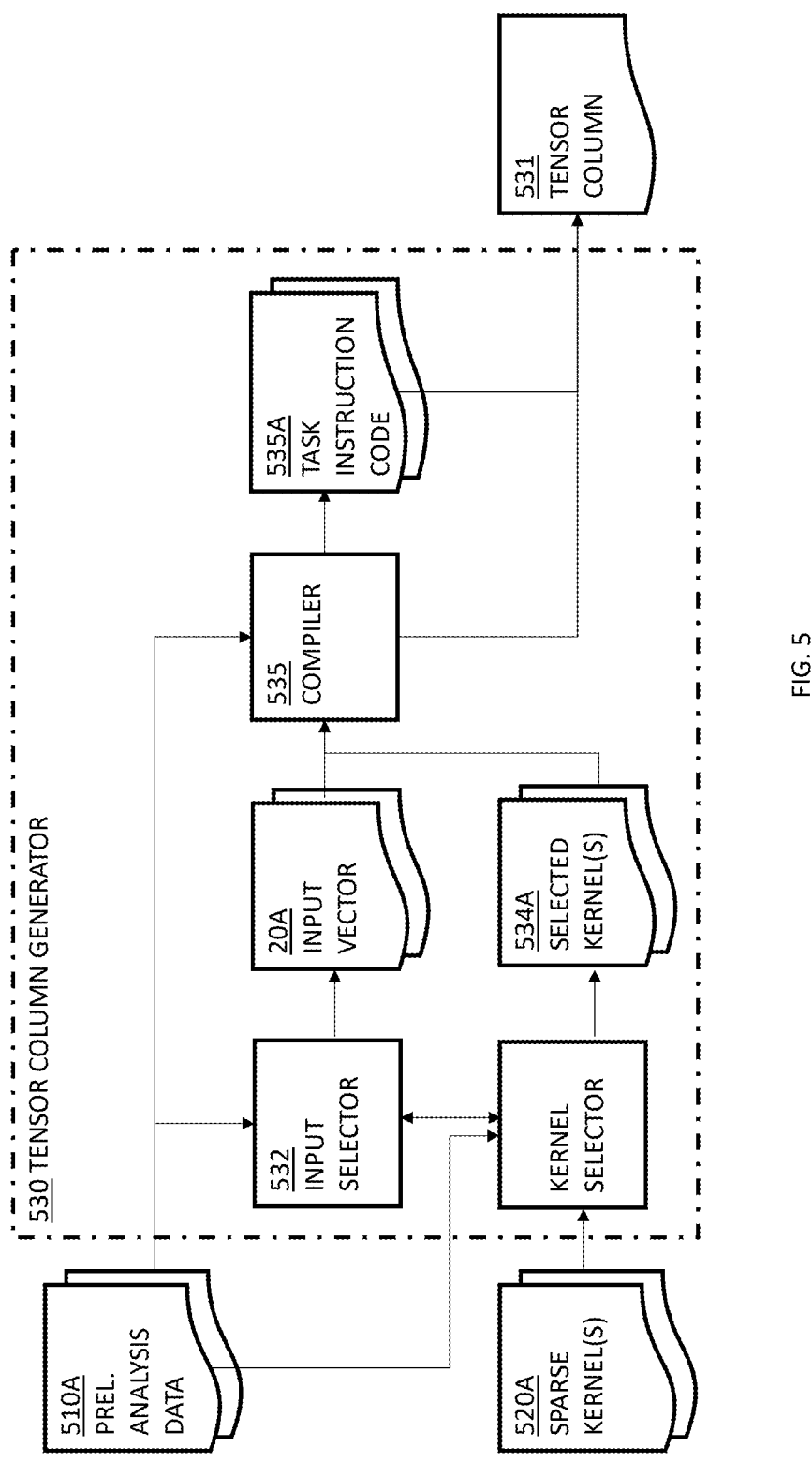
FIG. 5 is a block diagram of an example tensor column generator according to some embodiments.

System 50 may include a preliminary analysis module, configured to analyze the NN 10 data structure, and obtain one or more data elements of preliminary analysis (e.g., element 510A of FIG. 5). The preliminary analysis data may pertain to properties of NN 10 and/or the one or more target computing devices. For example, preliminary analysis data 510A may include data pertaining to kernels of NN 10. This may include, for example: which kernels need to be used at every layer, a size of each kernel, a subset of inputs (e.g., a subset of a buffer holding input 20 of FIG. 2) that corresponds to each kernel, a size (e.g., in data Bytes) of the corresponding subset of inputs, etc. In another example, preliminary analysis data 510A may include data pertaining to the computation corresponding to each kernel. This may include, for example a size of a required output buffer.

Preliminary analysis data 510A may include data pertaining to a size of a required output buffer, in relation to one or more versions of at least one kernel. For example, preliminary analysis module 510 may select or receive a subset of nodes of a layer of the NN as an input vector (e.g., element 20A of FIG. 5, which may be a subset of input 20) of a task. The nodes may, for example, be selected according to their relevance or connection to specific kernels that are being analyzed. Preliminary analysis module 510 may receive a kernel and calculate or estimate a required memory space for output of computations of the task, in view of, or according to the input vector.

In another example, preliminary analysis data 510A may include data pertaining to assignment of tasks 70 to the one or more target computing devices 60. For example, preliminary analysis module 510 may analyze the required memory space for performing one or more tasks in view of computational device parameters 40 (e.g., available data cache, available instruction cache, memory bandwidth, etc.) of the one or more target computing devices 60) to produce a list of preferences for task 70 assignment (e.g., assigning large tasks to computing devices having a large cache memory spaces, etc.).

Sparse kernel versions 520A may be produced during an initial (e.g., offline) stage of system 50, e.g., before inferring NN 10 on incoming data or input 20. In one embodiment executing sparse kernel multiplication may include broadcast and FMA instructions, but other types of instructions may be used for matrix multiply instructions.

Task 70 may be or may include a data structure (e.g., a table, a linked list, etc.) that may represent a subset or partition of NN 10, including for example one or more nodes or neurons, layers (or portions of layers, the portions defined for example by neurons within the layers), weights and edges of NN 10, or other data. In this manner the data for task 70 may define the extent or boundaries of the pyramid or tensor column. Additionally, task 70 may include one or more representations (e.g., matrices) of kernels 12 of NN 10. In other words, task 70 may include a representation of computations pertaining to kernels 12 of NN 10. In some cases kernels may be sparse. Kernels may be sparse prior to dividing into tasks, or kernels may be 'original' kernels, as they may be of an initial, or 'original' version (e.g., a dense version) of kernels 12, and may be subject to modification to create a sparse version of at least one kernel 12 (e.g., an 'original' or 'dense' kernel) of the one or more tasks 70.

Tensor column generator module 530 may compile task(s) 70 to produce one or more respective tensor column data elements 531. The tensor column data elements 531 may include task instruction code (e.g., element 535A of FIG. 5) that may represent at least one computation of the one or more tasks 70, a reference to one or more input vectors 20A of the task 70 and an allocation of output memory space, required to perform a computation of the task 70. Each task or tensor column may have dimensions or boundaries. The one or more tensor columns 531 may be produced so as to fit in respective one or more cache memories 610 of the one or more target computing devices 60, according to the received cache parameter values. The tensor columns may also be produced so that boundaries between adjacent tensor columns are created so that compression may take place in an advantageous manner.

According to some embodiments, the one or more target computing devices 60 may be configured (e.g., a computing device of FIG. 1) to store the tensor columns 531 in a cache memory space (e.g., element 610 of FIG. 1) associated with the one or more target computing devices 60. Additionally, or alternatively, the tensor columns 531 may be designed (e.g., by compiler element 535 of FIG. 5) so that the data therein may fit in a cache memory space 610 of the one or more target computing devices 60. The one or more target computing devices 60 may be thus configured (e.g., implicitly, by a cache policy of a processor 620 of target computing device 60) to keep the data in one or more caches.

Figure 4:
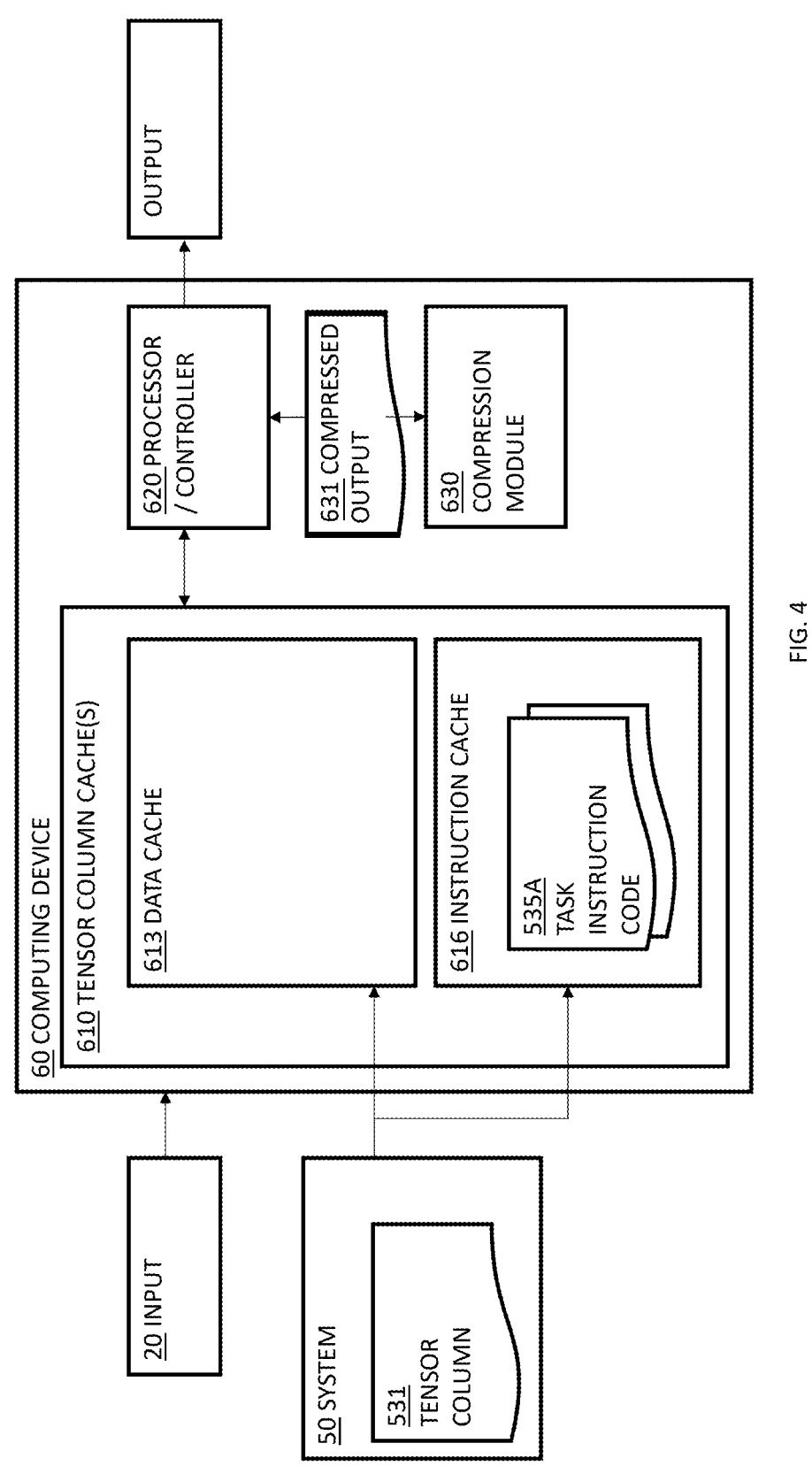
FIG. 4 is a block diagram of an example tensor column that may be produced according to some embodiments.

Reference is now made to FIG. 4, which is a block diagram, depicting an example of a tensor column that may be produced by system 50, according to some embodiments. Some elements of FIG. 4 are described with respect to the description of FIG. 5. The one or more tensor column data structures 531 may correspond to one or more specific respective tasks 70. System 50 may maintain or include in tensor column data structure 531 an input vector 20A that may include a reference to a subset of input to the respective layer.

For example, in a task that operates on an input layer of NN 10 (e.g. task 70A of FIG. 2, which operates in part on input layer 15A) input vector 20A may include a subset of incoming input data 20 and/or a reference thereto (e.g., a reference to specific entries in an input buffer that includes input 20). In a task that operates on an internal layer of NN 10 (e.g., task 70D of FIG. 2), input vector 20A may include a subset of incoming input data and/or a reference thereto, which may be activation from an output layer of a task or pyramid.

System 50 may maintain or include in the one or more tensor column data structures 531 one or more respective task instruction code data elements. The task instruction code data elements 535A may represent or implement computation of the tasks 70.

System 50 may allocate in the one or more tensor column data structures 531 an output memory space (e.g., a cache), corresponding to a respective task 70. System 50 may allocate the required memory space according to the calculation of the required space, as indicated by preliminary analysis module 510.

System 50 may store and/or allocate space for the one or more tensor columns in respective cache memories of the one or more target computing devices. For example, system 50 may (a) store one or more instruction code data elements 535A in an instruction cache 616 of a target computing device 60; (b) store input data (e.g., input vector 20A) or a reference thereto in a data cache 613 of the target computing device 60; and (c) allocate an output memory space in data cache 613 of the target computing device 60. Data cache 613 and instruction cache 616 may be implemented as for example the cache structures shown in FIG. 1, or other structures.

In embodiments where system 50 is implemented on the same computing device (e.g., FIG. 1) as target computing device 60, storing and/or allocating space on tensor column cache 610 (e.g., on instruction cache 613 and/or data cache 616) may be implemented directly by system 50.

Tasks 70 may include computation spanning or executing across a plurality of layers of NN 10. Hence, the respective tensor column may also include task instruction code that represents at least one computation spanning a plurality of layers of the NN.

The execution of NN 10 may refer herein to training of NN 10 as well as to inference of NN 10 on incoming data 20. For example, during an inference stage, system 50 may infer the neural network on incoming data 20 by executing the task instruction code 535A (e.g., from instruction cache 616) on the incoming data 20 (e.g., input vector 20A), within the cache memory space (e.g., using the input vector 20A and the allocated output memory space in data cache 613).

During a training stage, input vector 20A may include incoming training data, including for example feedback data (e.g., supervised training data) and back-propagation data (e.g., cost-function data) that may be required to train NN 10. System 50 may train NN 10 on incoming data 20 by executing the task instruction code 535A (e.g., from instruction cache 616) on the incoming data 20 (e.g., input vector 20A), within the cache memory space, to expedite the training process.

Reference is now made to FIG. 5, which is a block diagram, depicting an example of a tensor column generator 530 that may be included in a system 50 for executing neural networks, according to some embodiments. As shown in FIG. 5, tensor column generator 530 may receive as input at least one preliminary analysis data element 510A (e.g., from preliminary analysis module 510 of FIG. 3) and one or more kernel or sparse kernel versions 520A. Tensor column generator 530 may produce therefrom one or more tensor columns, pertaining to a task e.g., element 70 of NN 10 of FIG. 2.

Each of layers 15 of neural network 10 may include a varying number of kernels 12. In some embodiments, a layer 15 may require only a subset of kernels 12 to be applied to specific parts, regions or subsets of their input. Other layers may require all the kernels to be applied to each input region or subset.

Tensor column generator 530 may include an input selector module 532. As elaborated herein, preliminary analysis module 510 may analyze the data structure of NN 10 to obtain, for example, data pertaining to structure of NN 10. This data may include, for example, edges of NN 10, that may associate at least one input data element (e.g., a node in an input layer 15 of NN 10) with one or more respective kernels 12). According to some embodiments, input selector module 532 may be adapted to: receive the data pertaining to structure of NN 10 (e.g., as part of preliminary analysis data 510A); receive data pertaining to at least one selected kernel 534A; and select a subset of incoming data as an input vector 20A, based on the received data.

Input vector 20A may include an input or a subset of an input (or reference thereto), required for computation of a specific task (e.g., tasks 70 of FIG. 2). According to some embodiments of the invention, input selector module 532 may select input vector 20A by determining a number of nodes, pertaining to a first layer 15 (e.g., an output layer of a task, such as layer 15B of FIG. 2) of NN 10; and identifying a number of input nodes in one or more second layers that precede the first layer in NN 10, the input nodes pertaining to computation of the determined group of output nodes e.g., pertaining to one or more of kernels.

The nodes of the first layer may be determined iteratively. For example, input selector module 532 may start with an initial, small number of determined nodes of the first layer and gradually increase the number of determined nodes of the first layer as long as the required memory space for task computation is below the cache memory threshold. The identified number of input nodes may correspond to the largest number of computations (e.g., computation of kernel outputs) that results in a memory requirement that is less than the cache memory threshold. For example, the input nodes may be selected from layers that traverse along NN 10 as much as possible, such that the corresponding task may span or execute over as many layers of NN 10 as possible, but still having the required memory space for task computation below the cache memory threshold.

Selection of selected kernels 534A may affect input vector 20A and vice versa. For example, selection of a kernel 534A may dictate inclusion of one or more data input elements (e.g., input nodes of a layer in NN 10) in input vector 20A. input selector 532 may select the input vector 20A based on the one or more selected kernels 534A. Additionally, or alternatively, the selection of input vector 20A may be performed iteratively (e.g., over a number of iterations), until a required result is obtained. The required result may be, for example, a tensor column 531 that corresponds to a task, consuming the maximal memory space that is beneath the cache memory threshold (e.g., fits in a cache memory of a target computing device) and accommodates the precision requirement. Tensor column generator 530 may include a compiler module 535, adapted to compile one or more tasks 70 to produce one or more respective tensor columns 531.

A pyramid or task 70 may be or may include a data structure that represents a group of computations (e.g., computations of one or more kernels 12) of NN 10. For example, the one or more tasks 70 may be or may include subsets of the NN 10 data structure, including one or more representations of neural nodes, spanning over one or more layers 15 of NN 10. Tensor columns 531 may include a reference to an input vector (e.g., input vector 20A) of a task 70, an allocation of at least one output memory space of the task 70 and an element of task instruction code 535A that may represent at least one computation of the respective task 70 (e.g., at least one computation pertaining to a kernel of task 70).

Compiler module 535 may be configured to produce at least one task instruction code block 535A such that task instruction code block 535A may be compact, e.g., in terms of instruction cache memory 616 (FIG. 4) space consumption. For example, compiler 535 may receive (e.g., as part of preliminary analysis data 510) data pertaining to specific target computing device 60 (e.g., data pertaining to structure and/or an available instruction set of device 60) and may produce a compact task instruction code block 535A that optimally employs the data pertaining to device 60 or to a target architecture. For example, compiler module 535 may produce task instruction code 535A that may employ vector operations, such as multiply-accumulate operations or vector fused multiply-add (FMA), that may be specifically adapted to the architecture of target computing device 60. Compiler module 535 may produce the at least one task instruction code block 535A such that the task instruction code 535A may consume a minimal number of computing cycles.

Embodiments of the invention may compile the one or more tasks 70 to produce a task instruction code block 535A.

According to some embodiments, the structure of tensor column data structure 531 may facilitate multiple computations of kernel outputs, spanning over a plurality of layers of NN 10, during a stage of inference. For example a NN 10 may be adapted or trained to perform a task such as an image processing task (e.g., an object recognition task). During an inference stage of NN 10, a target computing device system 50 may receive an incoming data element 20 (e.g., an object to be recognized).

For each task (e.g., elements 70 of FIG. 2), including a plurality of kernel computations (e.g., computation of kernel elements 12), system 50 may obtain a data subset of incoming data according to each respective input vector 20A. For example, as depicted in FIG. 2, a first task 70 (e.g., task 70A) may receive as input a subset of a first layer (e.g., input 20). The first task may therefore be associated with a first input vector 20A that may include references or pointers to subsets of the first layer (e.g., an input layer of task 70A). The references or pointers of input vector 20A may be used to obtain the respective data subset (e.g., the respective portion of the input image). A second task 70D may receive as input a subset of a second layer (e.g., layer 15B). The second task may therefore be associated with a second input vector 20A that may include references or pointers to respective subsets of inputs to the second layer.

For each task 70, system 50 may produce a respective tensor column 531, including a task instruction code block 535A and a respective input vector. In embodiments where system 50 is implemented on a separate computing device than that of target computing device 60, system 50 may transfer the tensor column 531 to target computing device 60 for execution.

A processor (e.g., element 620 of FIG. 4) of target computing device 60 may perform the computation represented by the respective task instruction code block 535A on the obtained data subset (e.g., input vector 20A), within the target computing device's cache memory (e.g., tensor column cache element 610 of FIG. 4), starting with the first layer in the task. For example, for task 70B of FIG. 2, target computing device 60 may perform a computation of output 45 of kernels 12, by applying task instruction code block 535A (stored in instruction cache 616 of FIG. 4) on the obtained data input (e.g., a subset of an input layer). Target computing device 60 may then store the computation output in the allocated output memory space (e.g., on data cache 613 of FIG. 4).

Target computing device 60 may repeat the computation and storing steps with computations pertaining to subsequent layers of NN 10, using the data stored in the allocated output memory space as input for the subsequent computation. This may be done to the extent of the task instruction code, thus performing all the computations pertaining to a task within a cache memory space 610 of the target computing device 60.

Processor 620 may store the computation output in a compressed mode. For example, computing device may include a compression module 630, adapted to produce a compressed version 631 of the computed output. The compressed version 631 may include only elements of the computation output that have non-zero values (e.g., non-zero elements). In one embodiment, compression is performed only on the last layer in a pyramid task, but in other embodiments compression may occur before the end of a pyramid task. Processor 620 of computing device 60 may then store the compressed version 631 in the allocated output memory space, external memory, or cache, to be used for subsequent layer computations of the task 70. It may be appreciated that embodiments may thus improve NN processing: compression of the computation output may result in a reduced or more efficient use or consumption of cache memory space. The reduced consumption of cache memory space may, in turn, expand a scope of the computed task 70 (e.g., to include additional computations from the same layers of the task and/or from additional layers), and facilitate an improved level of parallelism to the inference and/or training of the NN. Compression may in some embodiments take place only on the last (e.g. output layer 15B in FIG. 2) layer of a pyramid or task, but may take place on layers internal to a task as well.

Figure 6:
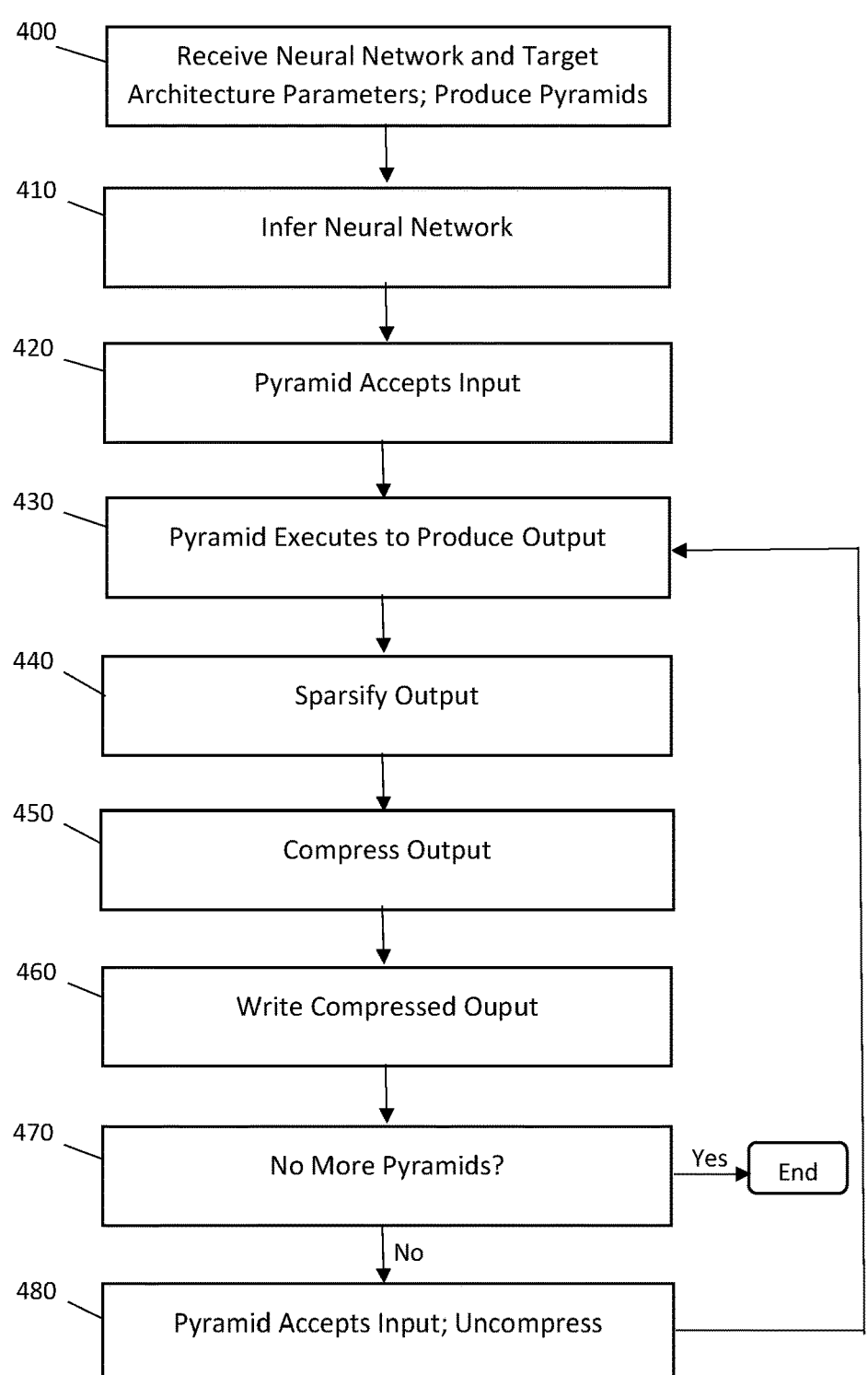
FIG. 6 is a flow diagram according to some embodiments.

Reference is now made to FIG. 6, which is a flow diagram, depicting an example of a method of executing (e.g., inferring and/or training) neural networks, according to some embodiments.

In operation 400, a data structure representing a NN may be received, parameters describing a target architecture may be received, and based on this data, tensor columns, pyramids or tasks may be produced, each representing a subset of the computations of NN 10. Tasks may be compiled to produce tensor column data elements. The tasks, pyramids or tensor columns may be created to include task instruction code representing at least one computation spanning a number of layers of the NN.

In operation 410, the target architecture may begin to infer the NN on incoming data by executing the task instruction code on the incoming data, within the cache memory space.

In operation 420, a task, computation, tensor column or pyramid may accept or read (e.g. from memory or cache) a portion or all of input. A tensor column at the beginning of the NN may accept a portion or all of input to the NN itself. However, tensor columns or pyramids may process only a portion, e.g. less than the entirety of the output or input for a layer of the NN.

In operation 430, the task, computation or tensor column may execute, or process the input, through one or more layers through known NN processes (e.g. multiplying a kernel by input data, or performing other operations) and produce an output. The output of the tensor column or pyramid may be considered to be the output of the last (e.g. furthest from the input of the NN) layer of the tensor column or pyramid. Executing tensor columns, or one or some of the tensor columns (e.g. a first of two tensor columns) may include multiplying a sparse kernel matrix by sparse input matrix.

In operation 440, the output of the tensor column or pyramid may be made more sparse than it otherwise is, e.g. to increase activation sparsity (e.g. the amount of zeros) in the output. This may be done, for example, by applying an activation function such as ReLU, FATReLU, or another function, to the output of the tensor column, e.g. to the output of the last layer of the tensor column (e.g. a multiplication of a kernel and input data, or another process), to produce the final output for the tensor column or pyramid. In some embodiments, applying such a function may be considered to be part of operation 430. Natural activation sparsity may be used, such that applying an activation function may not be performed.

In operation 450, the output, or sparsified output, of the task, computation, tensor column or pyramid, may be compressed. The compression may be using methods described herein (e.g. CSC) or other methods. The compression may be designed to ensure the compressed output fits within a cache memory, so that a subsequent tensor column using the output can avoid accessing memory. However, a compressed version may also be stored to memory external to the processor. In some embodiments, for some tensor columns or pyramids, no compression is done, for example on the last tensor column before output of the NN.

In operation 460, the compressed output, may be written or stored, e.g. to external memory or to cache. Typically the output is written one layer below where it is produced (e.g. from L3 cache to external memory), but it may be written to other storage.

In operation 470, if no more tensor columns or pyramids exist for the NN, processing may end, or processing in a tensor column manner may end (other NN processing may be involved, for example non-pyramidal or non-tensor column). If more tensor columns exist, processing may continue at operation 480.

In operation 480, a subsequent, adjacent or immediately adjacent tensor column or pyramid may accept as input (e.g. load or retrieve from the memory or cache to which it was stored in operation 460) a portion or all of the output compressed in operation 450 and may (e.g. at the start of the layer or later) uncompress the input to produce uncompressed output. Uncompression may take place, for example, after the data arrives at a cache private to a core (e.g. L1 level), or to a "JIT" matrix multiply process, or earlier, e.g. near the beginning of the pyramid process. The uncompressed output that the second tensor column takes as input may include or constitute less than the entirety of the output for a layer of the NN. If a compression algorithm such as CSC or CSR is used, where elements are accessible, uncompression need not be done. Processing may proceed in operation 430, with this subsequent tensor column executing and processing the input, which is the output from the previous tensor column. Accepting input may include reading, e.g. from external memory or from cache (e.g. where it was written in operation 460), compressed output from a previous tensor column or pyramid calculation. The process may proceed to operation 430.

In some embodiments, other processing may take place in the NN not using pyramidal tasks as described in some operations of FIG. 6. In some embodiments, pyramids may be parallel to one another, and thus some operations of FIG. 6 may take place more than once, once for each series of linked tensor columns. Other or different operations may be used.

Embodiments may divide or partition NN 10 to one or more tasks 70, each representing a portion or subset of NN 10. Embodiments of the invention may perform, in parallel, computations pertaining to the one or more tasks (e.g., on predefined, respective one or more target devices 60), and may subsequently accumulate the output of computations pertaining to the one or more tasks 70, to produce an overall, integrated execution (e.g., inference) of the NN.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method performed by at least one processor, the method comprising:
   receiving information indicating a size of a cache memory of a processor core on which at least a portion of a neural network (NN) is to be executed;
   partitioning the NN into a plurality of tensor columns based on the size of the cache memory of the processor core, wherein each tensor column of the plurality of tensor columns is adapted to fit within the cache memory of the processor core, and wherein each tensor column of the plurality of tensor columns includes:
      a reference to a set of input data on which to perform at least one computation;
      a set of task instruction code representing the at least one computation; and
      an allocation of output memory space within the cache memory of the processor core;
   executing a first tensor column of the plurality of tensor columns, the first tensor column comprising a first set of task instruction code representing at least one computation and spanning only a portion of a layer of each of a first plurality of layers of the NN, the execution producing an output;
   compressing the output;
   uncompressing the compressed output to produce uncompressed output; and
   executing a second tensor column of the plurality of tensor columns, the second tensor column comprising a second set of task instruction code representing at least one computation and spanning only a portion of a layer of each of a second plurality of layers of the NN, the second tensor column taking as input the uncompressed output.

2. The method of claim 1, wherein executing the first tensor column comprises multiplying a kernel matrix by an input matrix.

3. The method of claim 1, wherein at least one tensor column of the plurality of tensor columns includes as a boundary a layer including an activation function increasing activation sparsity.

4. The method of claim 1, wherein the compression takes place at a boundary layer of the first tensor column.

5. The method of claim 1, wherein the uncompressed output that the second tensor column takes as input comprises less than the entirety of the output for a layer of the NN.

6. The method of claim 1, further comprising storing the compressed output.

7. The method of claim 1, wherein the first plurality of layers is the same as the second plurality of layers.

8. A system comprising:
   a memory; and
   a processor, configured to:
      receive information indicating a size of a cache memory of a processor core on which at least a portion of a neural network (NN) is to be executed;
      partition the NN into a plurality of tensor columns based on the size of the cache memory of the processor core, wherein each tensor column of the plurality of tensor columns is adapted to fit within the cache memory of the processor core, and wherein each tensor column of the plurality of tensor columns includes:

a reference to a set of input data on which to perform at least one computation;

a set of task instruction code representing the at least one computation; and an allocation of output memory space within the cache memory of the processor core;

execute a first tensor column of the plurality of tensor columns, the first tensor column comprising a first set of task instruction code representing at least one computation and spanning only a portion of a layer of each of a first plurality of layers of the NN, the execution producing an output;

compress the output;

uncompress the compressed output to produce uncompressed output; and execute a second tensor column of the plurality of tensor columns, the second tensor column comprising a second set of task instruction code representing at least one computation and spanning only a portion of a layer of each of a second plurality of layers of the NN, the second tensor column taking as input the uncompressed output.

9. The system of claim 8, wherein executing the second tensor column comprises multiplying a kernel matrix by an input matrix.

10. The system of claim 8, wherein at least one tensor column of the plurality of tensor columns includes as a boundary a layer including an activation function increasing activation sparsity.

11. The system of claim 8, wherein the compression takes place at a boundary layer of the first tensor column.

12. The system of claim 8, wherein the uncompressed output that the second tensor column takes as input comprises less than the entirety of the output for a layer of the NN.

13. The system of claim 8, wherein the processor is configured to store the compressed output.

14. The system of claim 8, wherein the first plurality of layers is different from the second plurality of layers.

15. A method performed by at least one processor, the method comprising:

receiving information indicating a size of a cache memory of a processor core on which at least a portion of a neural network (NN) is to be executed;

partitioning the NN into a plurality of pyramid tasks based on the size of the cache memory of the processor core, wherein each pyramid task of the plurality of pyramid tasks is adapted to fit within the cache memory of the processor core, and wherein each pyramid task of the plurality of pyramid tasks includes:

a reference to a set of input data on which to perform at least one computation;

a set of task instruction code representing the at least one computation; and an allocation of output memory space within the cache memory of the processor core;

executing a first pyramid task of the plurality of pyramid tasks, the first pyramid task being executed across only a portion of a layer of each of a first plurality of layers of the NN to produce an output;

compressing the output and storing the compressed output;

retrieving and uncompressing the compressed output to produce uncompressed output; and using the uncompressed output, executing a second pyramid task of the plurality of pyramid tasks, the second pyramid tasks being executed across only a portion of a layer of each of a second plurality of layers of the NN.

16. The method of claim 15, wherein executing at least one pyramid task of the plurality of pyramid tasks comprises multiplying a kernel matrix by an input matrix.

17. The method of claim 15, wherein at least one pyramid task of the plurality of pyramid tasks includes as a boundary a layer including an activation function increasing activation sparsity.

18. The method of claim 15, wherein the compression takes place at a boundary layer of the first pyramid task.

19. The method of claim 15, wherein the uncompressed output that the second pyramid task takes as input consists of less than the entirety of the output for a layer of the NN.

20. The method of claim 15, wherein the first plurality of layers is the same as the second plurality of layers.

21. A method performed by at least one processor, the method comprising:

receiving information indicating a size of a cache memory of a processor core on which at least a portion of a neural network (NN) is to be executed;

partitioning the NN into a plurality of tensor columns based on the size of the cache memory of the processor core, wherein each tensor column of the plurality of tensor columns is adapted to fit within the cache memory of the processor core, and wherein each tensor column of the plurality of tensor columns includes:

a reference to a set of input data on which to perform at least one computation;

a set of task instruction code representing the at least one computation; and an allocation of output memory space within the cache memory of the processor core; and executing a first tensor column of the plurality of tensor columns, the first tensor column comprising a first set of task instruction code representing at least one computation and spanning only a portion of a layer of each of a first plurality of layers of the NN, to thereby produce a set of gradients;

compressing the set of gradients;

uncompressing the compressed set of gradients to produce uncompressed gradients; and performing backpropagation, using the uncompressed gradients, on a second tensor column of the plurality of tensor columns, the second tensor column comprising a second set of task instruction code representing at least one computation and spanning only a portion of a layer of each of a second plurality of layers of the NN.

22. The method of claim 21, wherein executing at least one tensor column of the plurality of tensor columns comprises multiplying a kernel matrix by an input matrix.

23. The method of claim 21, wherein at least one tensor column of the plurality of tensor columns includes as a boundary a layer including a pooling layer.

* * * * *